(12) United States Patent
Ju et al.

(10) Patent No.: US 11,680,699 B2
(45) Date of Patent: Jun. 20, 2023

(54) LAMP, LAMP SYSTEM, METHOD FOR ASSEMBLING LAMP SYSTEM, AND METHOD FOR DISASSEMBLING LAMP SYSTEM

(71) Applicants: Radiant Opto-Electronics (Suzhou) Co., Ltd., Wujiang Jiangsu (CN); Radiant Opto-Electronics Corporation, Kaohsiung (TW)

(72) Inventors: Chih-Hung Ju, Kaohsiung (TW); Cheng-Ang Chang, Kaohsiung (TW); Shang-Chia Liu, Kaohsiung (TW)

(73) Assignees: RADIANT OPTO-ELECTRONICS (SUZHOU) CO., LTD., Wujiang Jiangsu (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 94 days.

(21) Appl. No.: 16/596,910

(22) Filed: Oct. 9, 2019

(65) Prior Publication Data
US 2020/0116342 A1    Apr. 16, 2020

(30) Foreign Application Priority Data

Oct. 12, 2018  (CN) .................. PCT/CN2018/110071
Apr. 23, 2019  (CN) .................. PCT/CN2019/083861

(51) Int. Cl.
*F21V 23/06*     (2006.01)
*F21V 8/00*      (2006.01)
(Continued)

(52) U.S. Cl.
CPC ................ *F21V 23/06* (2013.01); *F21S 8/06* (2013.01); *G02B 6/0083* (2013.01); *F21Y 2115/10* (2016.08)

(58) Field of Classification Search
CPC .......... F21V 23/06; F21S 8/06; G02B 6/0083; F21Y 2115/10
(Continued)

(56) References Cited

U.S. PATENT DOCUMENTS 5,282,600 A    2/1994  Weiss et al.
8,104,920 B2   1/2012  Dubord
(Continued)

FOREIGN PATENT DOCUMENTS

CN   101900270 A   12/2010
CN   102252180 A   11/2011
(Continued)

OTHER PUBLICATIONS

English translation of CN 10 6885186 (Jun. 23, 2017) (Year: 2017).*

*Primary Examiner* — Andrew J Coughlin
*Assistant Examiner* — Hana S Featherly
(74) *Attorney, Agent, or Firm* — McClure, Qualey & Rodack, LLP

(57) ABSTRACT

A lamp, a lamp system, a method for assembling a lamp system, and a method for disassembling a lamp system are provided. The lamp includes a frame body, a light guide plate, a light source, and a connecting mechanism. The frame body includes two side covers and two end caps. An accommodating space is formed among the side covers and the end caps. The light guide plate is disposed in the accommodating space. The light source is disposed in one of the side covers. The connecting mechanism includes an electrical connecting assembly and a suspension member. The electrical connecting assembly is connected to the light source to form an electrical loop. Each of the end caps has a groove, and one end of the suspension member is passed (Continued)

through one of the grooves from a first end of the groove and is positioned in a second end of the groove.

14 Claims, 11 Drawing Sheets

(51) Int. Cl.
    *F21S 8/06*     (2006.01)
    *F21Y 115/10*     (2016.01)

(58) Field of Classification Search
    USPC .......................................................... 362/600
    See application file for complete search history.

(56) References Cited

U.S. PATENT DOCUMENTS

| | | | |
|---|---|---|---|
| 8,231,258 | B2 | 7/2012 | Kim et al. |
| 8,740,437 | B2 | 6/2014 | Kim et al. |
| 8,746,933 | B2 | 6/2014 | Cho et al. |
| 9,470,375 | B2 | 10/2016 | Van Es |
| 9,869,458 | B2 | 1/2018 | Li |
| 10,126,486 | B2 | 11/2018 | Ju et al. |
| 10,247,373 | B1 | 4/2019 | Ladewig et al. |
| 10,295,861 | B2 | 5/2019 | Chang et al. |
| 10,598,350 | B2 | 3/2020 | Ji et al. |
| 10,725,231 | B2 | 7/2020 | Ross et al. |
| 10,935,308 | B2 | 3/2021 | Fei et al. |
| 2002/0118537 | A1 | 8/2002 | Segretto |
| 2004/0114361 | A1 | 6/2004 | Severtson et al. |
| 2012/0018212 | A1* | 1/2012 | Wu .................. H02G 3/20 174/40 R |
| 2012/0099318 | A1 | 4/2012 | Liu |
| 2014/0160747 | A1 | 6/2014 | Jang et al. |
| 2015/0300585 | A1 | 10/2015 | Wu et al. |
| 2015/0338053 | A1 | 11/2015 | Rector et al. |
| 2017/0002990 | A1 | 1/2017 | O'Brien et al. |
| 2017/0153013 | A1 | 6/2017 | Balkaya |
| 2021/0071832 | A1 | 3/2021 | Gomez Martinez et al. |
| 2021/0141149 | A1 | 5/2021 | Nijkamp et al. |
| 2021/0231862 | A1 | 7/2021 | Ju et al. |

FOREIGN PATENT DOCUMENTS

| | | |
|---|---|---|
| CN | 202026101 U | 11/2011 |
| CN | 102410452 A | 4/2012 |
| CN | 102454904 A | 5/2012 |
| CN | 202253153 U | 5/2012 |
| CN | 102913828 A | 2/2013 |
| CN | 203848139 U | 9/2014 |
| CN | 104329602 A | 2/2015 |
| CN | 104641166 A | 5/2015 |
| CN | 204479882 U | 7/2015 |
| CN | 104879687 A | 9/2015 |
| CN | 104879699 A | 9/2015 |
| CN | 204943211 U | 1/2016 |
| CN | 205079122 U | 3/2016 |
| CN | 205877948 U | 1/2017 |
| CN | 106537020 A | 3/2017 |
| CN | 106885186 A | 6/2017 |
| CN | 107062103 A | 8/2017 |
| CN | 107191833 A | 9/2017 |
| CN | 107314327 A | 11/2017 |
| CN | 107388114 A | 11/2017 |
| CN | 107842720 A | 3/2018 |
| CN | 107842786 A | 3/2018 |
| CN | 107917373 A | 4/2018 |
| CN | 108286687 A | 7/2018 |
| CN | 207569629 U | 7/2018 |
| CN | 108386778 A | 8/2018 |
| CN | 108518627 A | 9/2018 |
| DE | 20005623 U1 | 2/2001 |
| EP | 2431654 A2 | 3/2012 |
| GB | 563224 A | 8/1944 |
| KR | 20000058761 A | 10/2000 |
| KR | 20110070406 A | 6/2011 |
| TW | 201616042 A | 5/2016 |
| TW | 201721056 A | 6/2017 |
| TW | M558872 U | 4/2018 |
| WO | 2014135555 A1 | 9/2014 |
| WO | 2020073637 A | 4/2020 |

* cited by examiner

ND METHOD FOR DISASSEMBLING LAMP
LAMP, LAMP SYSTEM, METHOD FOR ASSEMBLING LAMP SYSTEM, AND METHOD FOR DISASSEMBLING LAMP SYSTEM

RELATED APPLICATIONS

This application claims priority to International Application No. PCT/CN2019/083861 filed on Apr. 23, 2019 and International Application No. PCT/CN2018/110071 filed on Oct. 12, 2018. The entire contents of each of which are incorporated by reference.

BACKGROUND

Field of Invention

The present disclosure relates to an illuminating device. More particularly, the present disclosure relates to a lamp, a lamp system, a method for assembling lamp system, and a method for disassembling lamp system.

Description of Related Art

Lamps become more diversified to meet market requirements. One of conventional lamps is a hanging transparent lamp which can achieve better appearance and illumination.

However, hanging transparent lamps mostly uses externally exposed wires to connect to a power supply. Such externally exposed wires not only have complicated assembling processes and high manufacturing cost, but also result in a messy visual effect in a space.

In particular, when multiple transparent lamps are need to be connected in series, because each of the transparent lamps has an outer frame, light-emitting surfaces of the lamps are not continuously connected, thus resulting in inconsistent and non-aesthetic appearance as well as occurring partial dark areas on the light-emitting surfaces.

SUMMARY

One object of the present invention is to provide a lamp that can be rapidly assembled and disassembled according to a frame design of the lamp.

According to the aforementioned object, a lamp is provided. The lamp includes a frame body, a light guide plate, at least one light source, and a connecting mechanism. The frame body includes two side covers and two end caps, in which an accommodating space is formed among the side covers and the end caps. The light guide plate is disposed in the accommodating space. The light source is disposed in the at least one of the side covers, in which the light source is disposed adjacent to a light-incident surface of the light guide plate. The connecting mechanism is disposed in the frame body. The connecting mechanism includes an electrical connecting assembly and a suspension member. The electrical connecting assembly is connected to the light source to form an electrical loop. Each of the end caps has a groove, and at least one end of the suspension member is passed through at least one of the grooves from a first end of the groove and is positioned in a second end of the groove.

According to an embodiment of the present invention, the lamp further includes plural side bars respectively and correspondingly fixed on the side covers. Each of the side covers comprises a carrying portion, a first end and a second end opposite to the first end. Each of the side bars separates its corresponding side cover into an upper channel and a lower channel. The two end caps are disposed in the upper channels, and one of the two end caps is located at the first ends of the side covers, and the other one of the two end caps is located at the second ends of the side covers. The light guide plate is carried on the carrying portions of the side covers and is located in the lower channels of the side covers.

According to an embodiment of the present invention, the light guide plate has a first light-emitting surface and a second light-emitting surface. The first light-emitting surface and the second light-emitting surface are respectively connected to two opposite edges of the light-incident surface, and only side edge portions of the first light-emitting surface and the second light-emitting surface are covered by the frame body.

According to an embodiment of the present invention, the groove extends from a side surface of the end cap to a top surface of the end cap, and the first end of the groove is located on the side surface, and the second end of the groove is located on the top surface. The at least one end of the suspension member is passed through the groove from the side surface and is positioned on the top surface.

According to an embodiment of the present invention, a limiting block is disposed on the at least one end of the suspension member. A width of the first end of the groove is greater than a width of the limiting block, and a width of the second end of the groove is smaller than the width of the limiting block.

According to an embodiment of the present invention, the frame body further includes two upper covers respectively covers the end caps. Each of the upper covers has a notch, in which the notches are respectively corresponding to the grooves of the end caps, and the suspension member is located in the at least one of the notches.

According to the aforementioned object, a lamp system is provided. The lamp system includes at least two aforementioned lamps. The end cap of one of the lamps is coupled to the end cap of another one of the lamps adjacent to the one of the lamps, and the groove of the end cap of the one of the lamps communicates with the groove of the end cap of the another one of the lamps. The electrical connecting assembly of the one of the lamps is connected to the electrical connecting assembly of the another one of the lamps. The at least one end of the suspension member is slidable between the grooves of the adjacent end caps.

According to an embodiment of the present invention, the light guide plates of the lamps are continuously connected to each other.

According to an embodiment of the present invention, the electrical connecting assembly of an endmost one of the lamps is connected to an external power source. The electrical connecting assembly of each of the rest of the lamps is connected to the electrical connecting assembly of its adjacent lamp so as to form a connection with the endmost one of the lamps.

According to the aforementioned object, a method for disassembling a lamp system is provided. The method includes the following steps. First, a lamp system is provided, in which the lamp system includes at least two aforementioned lamps. Thereafter, the suspension member is slid out of the groove of one of the lamps desired to be disassembled into the groove of another one of the lamps adjacent to the one of the lamps. Then, the one of the lamps is separated from the another one of the lamps so as to separate the end cap of the one of the lamps from the end cap of the another one of the lamps. Then, the one of the lamps desired to be disassembled is removed.

According to an embodiment of the present invention, the groove of each of the lamps extends from a side surface of the end cap to a top surface of the end cap. The suspension member is first slid from the top surface to the side surface of the end cap of the one of the lamps desired to be disassembled and is further slid to the side surface of the end cap of the another one of the lamps adjacent to the one of the lamps and is then positioned on the top surface of the end cap of the another one of the lamps.

According to the aforementioned object, a method for assembling a lamp system is provided. The method includes the following steps. First, at least two aforementioned lamps are provided. Then, the electrical connecting assembly of one of the lamps is connected to the electrical connecting assembly of another one of the lamps adjacent to the one of the lamps, so that the end cap of the one of the lamps is connected to the end cap of the another one of the lamps, and the groove of the end cap of the one of the lamps communicates with the groove of the end cap of another one of the lamps. Thereafter, the suspension member is slid from the groove of the one of the lamps to the groove of the another lamps adjacent to the one of the lamps.

According to an embodiment of the present invention, the groove of each of the lamps extends from a side surface of the end cap to a top surface of the end cap. The suspension member is first slid from the top surface to the side surface of the end cap of the one of the lamps and is further slid to the side surface of the end cap of the another one of the lamps and is then positioned on the top surface of the end cap of the another one of the lamps.

According to an embodiment of the present invention, the frame body of each of the lamps further comprises two upper covers respectively corresponding to the end caps, and each of the upper covers has a notch corresponding to each groove. After the suspension member is slid from the groove of the one of the lamps to the groove of the another one of the lamps adjacent to the one of the lamps, the aforementioned method further comprises respectively covering the upper covers on the end caps so as to limit the suspension member in the notch of the upper cover.

According to an embodiment of the present invention, before the end cap of the one of the lamps is connected to the end cap of the another one of the lamps adjacent to the one of the lamps, the aforementioned method further comprising disposing at least two supporting bars between the inner spaces of the side covers of adjacent two lamps.

According to the aforementioned embodiments of the present disclosure, the present disclosure uses the frame body to integrate the electrical connecting assembly and the suspension member, thereby simplifying the structure of the lamp as well as providing an easy-to-assemble (or easy-to-disassemble) way for users when multiple lamps need to be connected together or disassembled from each other.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
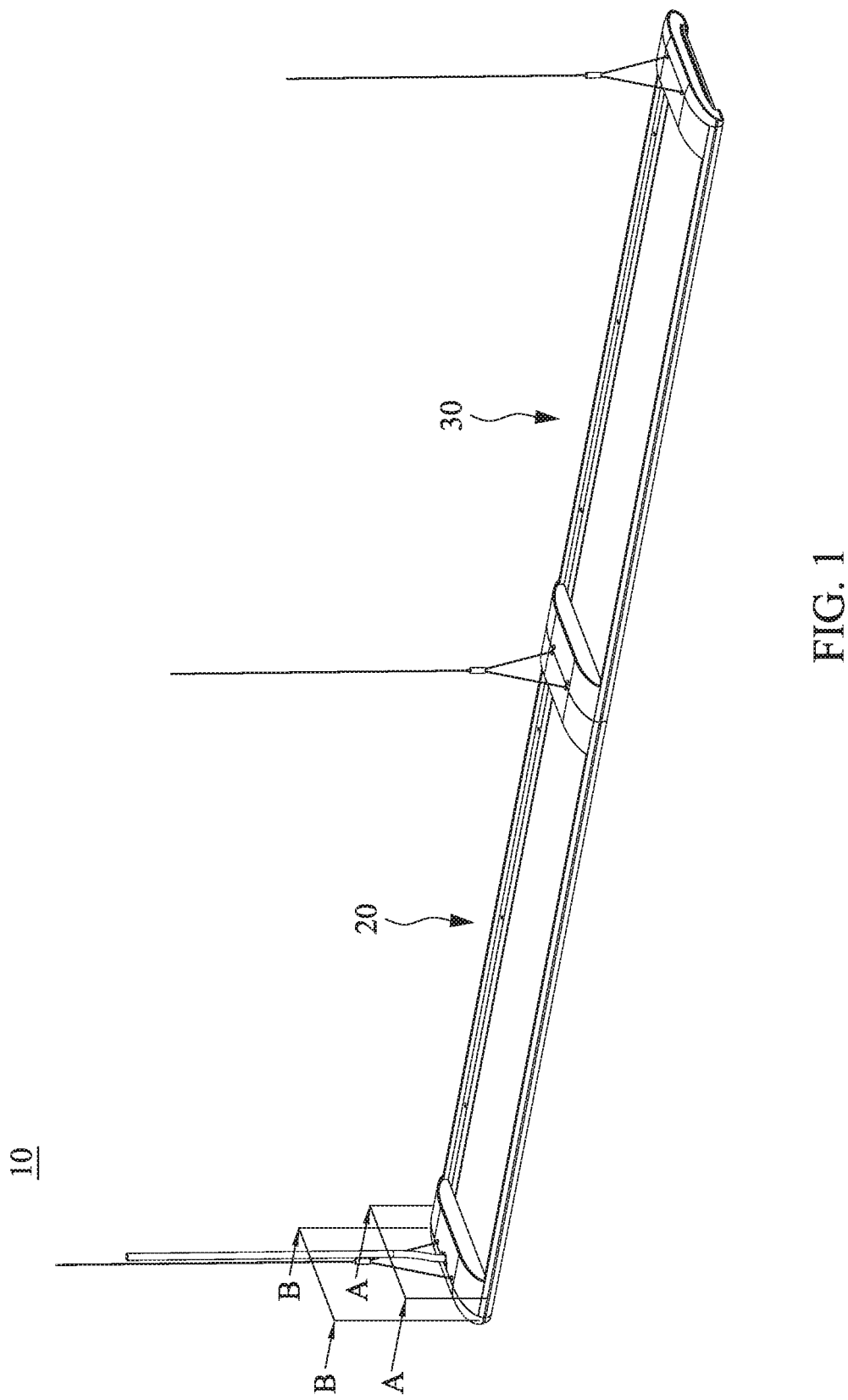
FIG. 1 is a schematic structural diagram showing a lamp system in accordance with an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Spatially relative terms used in the present disclosure, such as "upper," "beneath," "lower," "X-direction," "Y-direction," and the like, may be used herein for ease of description to describe one element or feature's relationship to another element(s) or feature(s) as illustrated in the figures.

Figure 2:
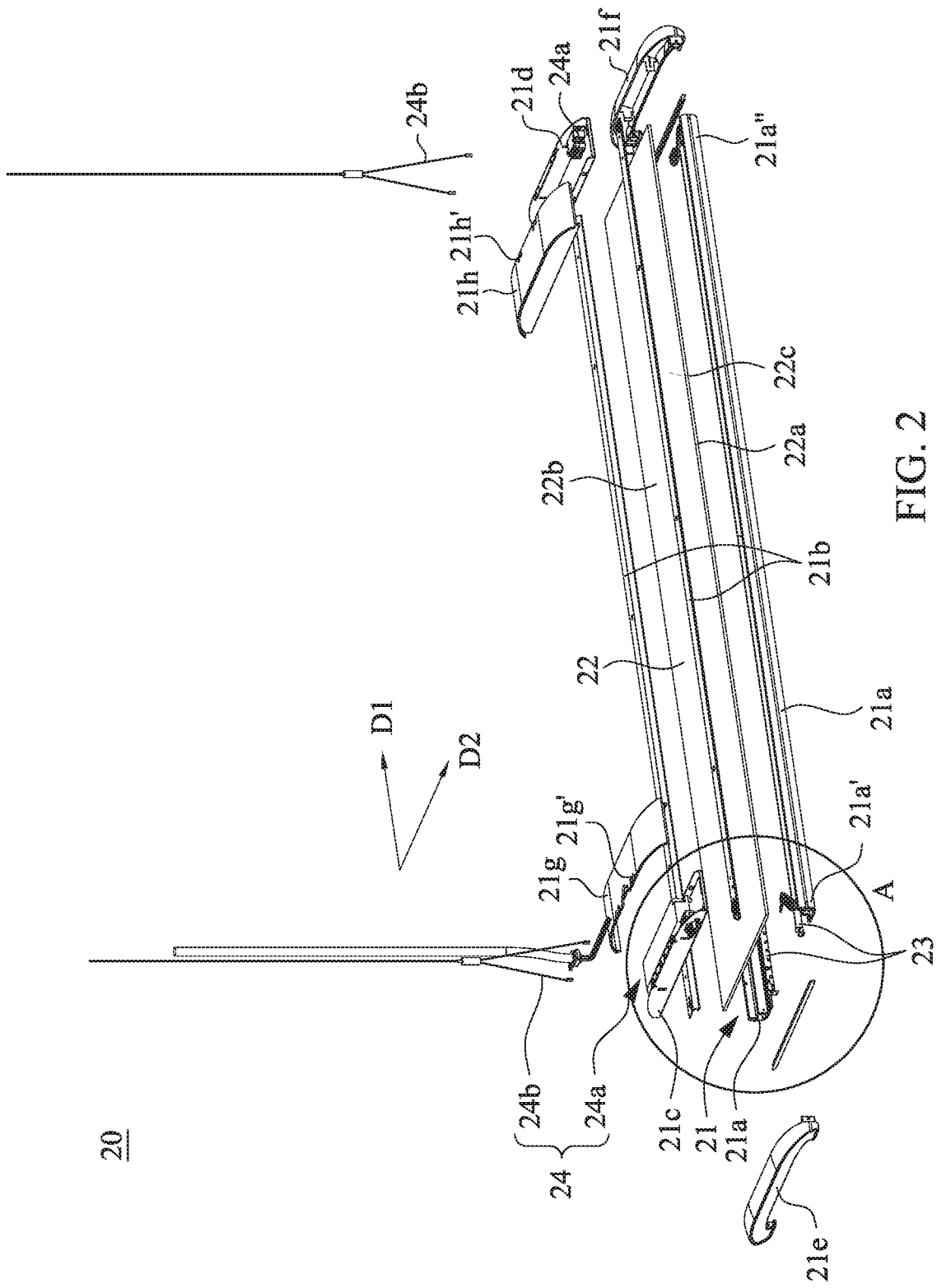
FIG. 2 is a schematic exploded view showing a lamp in accordance with an embodiment of the present disclosure.

Referring to FIG. 1 and FIG. 2, FIG. 1 is a schematic structural diagram showing a lamp system 10 in accordance with an embodiment of the present disclosure, and FIG. 2 is a schematic exploded view showing a lamp 20 in accordance with an embodiment of the present disclosure. The lamp system 10 in the present embodiment is mainly constituted by at least two lamps (such as the lamp 20 and a lamp 30) connected in series. The lamp 20 mainly includes a frame body 21, a light guide plate 22, at least one light source 23 and a connecting mechanism 24. The frame body 21 includes two side covers 21a, two side bars 21b, a first end cap 21c, a second end cap 21d, a first decorative cover 21e, a second decorative cover 21f, a first upper cover 21g and a second upper cover 21h.

Figure 3:
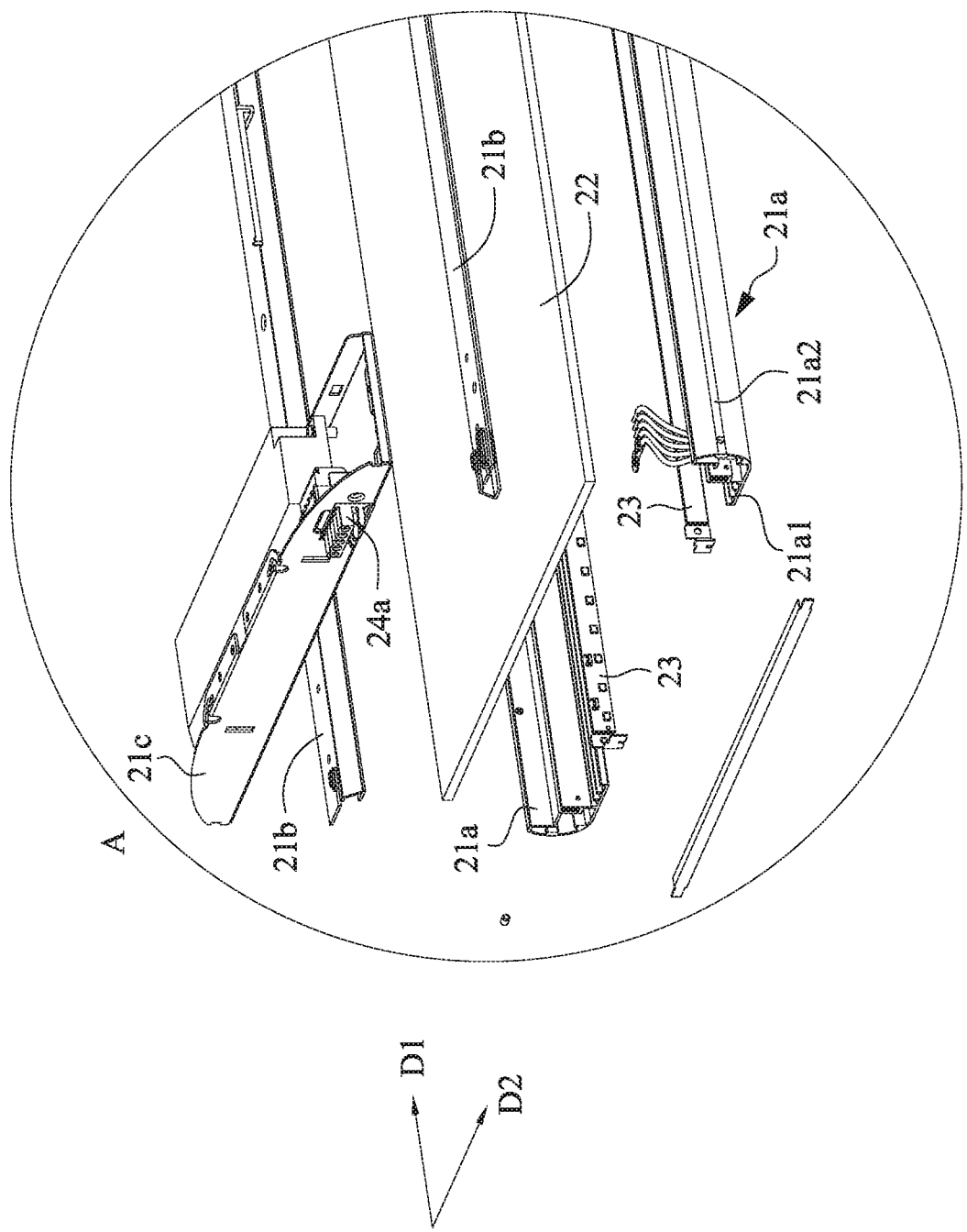
FIG. 3 is an enlarged view of zone "A" in FIG. 2.

Simultaneously referring to FIG. 2 and FIG. 3, FIG. 3 is an enlarged view of zone "A" in FIG. 2. In one embodiment, the side covers 21a are extended along a first direction D1 (e.g. X-direction), and each of the side covers 21a has a first end 21a' and a second end 21a" opposite to each other. In addition, the first end cap 21c and the second end cap 21d are extended along a second direction D2 (e.g. Y-direction). The first end cap 21c is disposed on the first ends 21a' of the side covers 21a, and the second end cap 21d is disposed on the second ends 21a" of the side covers 21a. Therefore, an accommodating space is defined among the two side covers 21a which extend along the X-direction as well as the first end cap 21c and the second end cap 21d which extend along the Y-direction. The light guide plate 22 is disposed in the accommodating space. Each of the side covers 21a includes a carrying portion 21a1 and a sidewall 21a2, in which the sidewall 21a2 is connected to a side edge of the carrying portion 21a1. The light source 23 is disposed on the carrying portion 21a1 and is adjacent to a light-incident surface 22a of the light guide plate 22. In one embodiment, the light source 23 is a LED light bar.

Figure 4:
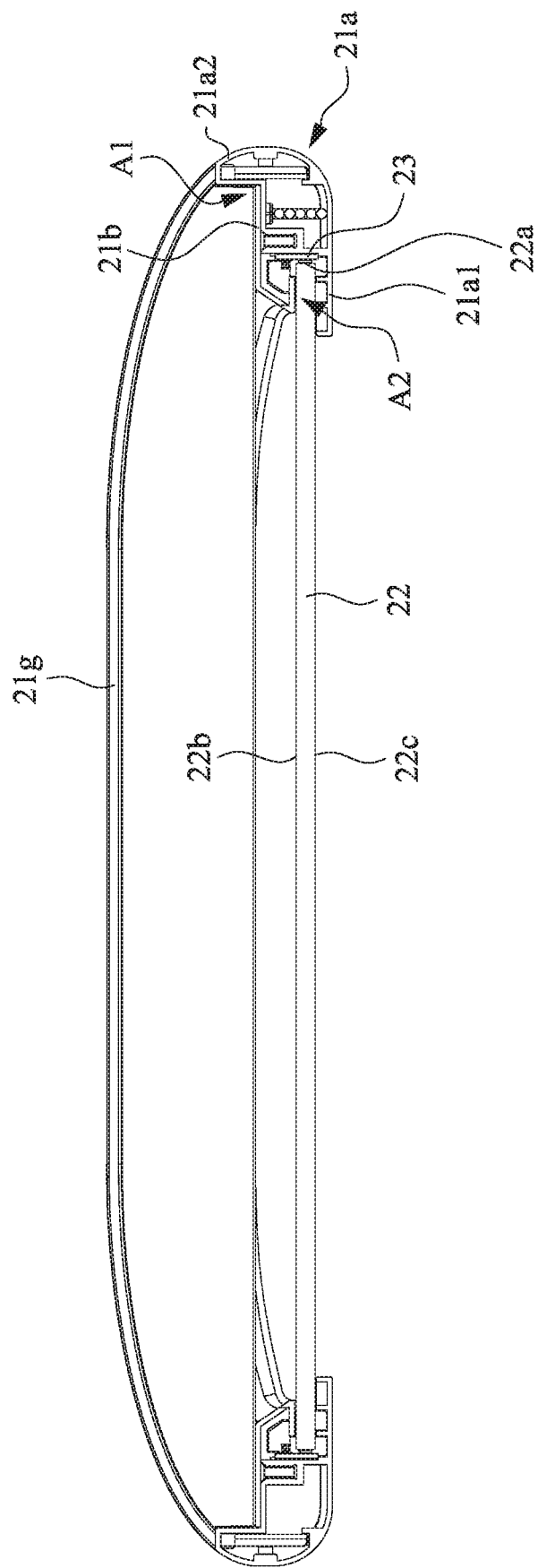
FIG. 4 is a schematic cross-sectional view taken along line A-A in FIG. 1.

Simultaneously referring to FIG. 4, FIG. 4 is a schematic cross-sectional view taken along line A-A in FIG. 1. The side bars 21b are extended along the first direction D1 and are respectively and correspondingly disposed on the side covers 21a. Each of the side bars 21b separates its corresponding side cover 21a into an upper channel A1 and a lower channel A2. The upper channel A1 is a space surrounded by a top surface of the side bar 21b and the sidewall 21a2 of the side cover 21a. The lower channel A2 is a space surrounded by a bottom portion of the side bar 21b and the carrying portion 21a1 of the side cover 21a. The light guide plate 22 is disposed in the lower channels A2 and is located between the bottom portion of the side bar 21b and the carrying portion 21a1. The light guide plate 22 has a first light-emitting surface 22b and a second light-emitting surface 22c, in which the first light-emitting surface 22b and the second light-emitting surface 22c are respectively connected to two opposing sides of the light-incident surface 22a. In addition, the first end cap 21c and the second end cap 21d are located in the upper channels A1. The connecting mechanism 24 includes an electrical connecting assembly 24a and a suspension member 24b, and the electrical connecting assembly 24a is disposed in the first end cap 21c and the second end cap 21d. With such design, since the light guide plate 22 is located in the lower channels A2, the electrical connecting assembly 24a disposed in the upper channel A1 will not block light from emitting downwards from the light guide plate 22. In the present embodiment, a portion of the light guide plate 22 near the light-incident surface 22a is disposed between the bottom portion of each the side bar 21b and the carrying portion 21a1 of each side cover 21a and is located adjacent to the light source 23 on the carrying portions 21a1. In other words, only portions of the first light-emitting surface 22b and the second light-emitting surface 22c of the light guide plate 22 near side edges are located between the side bar 21b and the side cover 21a (i.e. only the portions near the side edges are covered by the frame body 21), thereby hiding hotspot phenomenon occurring on the portions of the first light-emitting surface 22b and the second light-emitting surface 22c of the light guide plate 22 near the light source 23.

Figure 5:
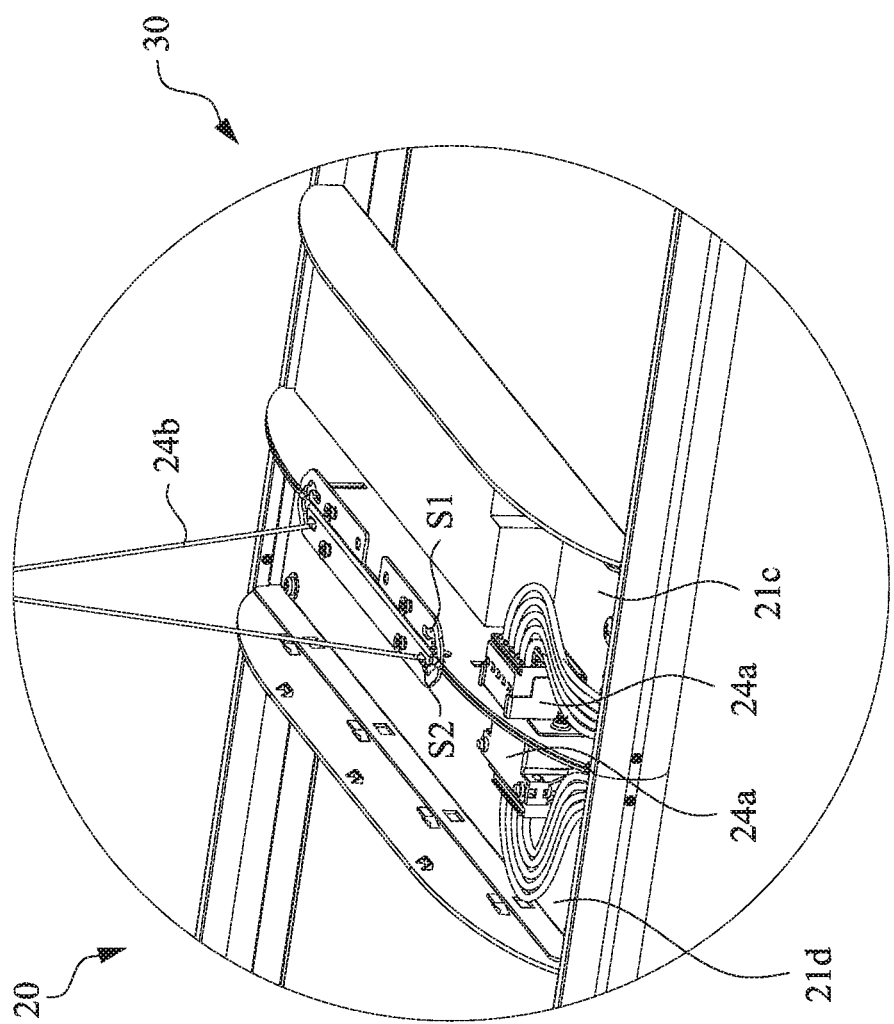
FIG. 5 is a partial structural diagram showing the lamps jointed together in accordance with an embodiment of the present disclosure.

Referring to FIG. 2 and FIG. 3 again, the electrical connecting assembly 24a is disposed on the first end cap 21c and the second end cap 21d and is connected to the light source 23 so as to form an electrical loop. Therefore, the electrical connecting assembly 24a of the lamp 20 not only can provide power required by the light source 23 itself, but also can be electrically connected to another electrical connecting assembly 24a of another lamp. In one embodiment, the electrical connecting assembly 24a is an electrically connected system formed by a quick connector and an internal wire of the lamp. Also referring to FIG. 5, FIG. 5 is a partial structural diagram showing the lamps jointed together in accordance with an embodiment of the present disclosure. It is noted that, the lamp 20 and the lamp 30 have substantially same structure. In the present embodiment, the lamp 20 is the first lamp (i.e. the endmost lamp). When the lamp 20 and the lamp 30 are connected together, the electrical connecting assembly 24a of the lamp 20 is connected to the electrical connecting assembly 24a of the lamp 30, and the electrical connecting assembly 24a of the lamp 20 is connected to an external power source. Therefore, the power provided by the external power source which is transmitted to the electrical connecting assembly 24a of the lamp 20 is further transmitted to the lamp 30. In other embodiments, if there is another lamp to be connected to the lamp 30, the power transmitted to the lamp 30 is further transmitted to the another lamp by the electrical connecting assembly 24a. Therefore, only one external power source is used to provide power for multiple lamps instead of setting up multiple external power sources on each lamp, thereby forming a lamp with simple wiring structure as well as easy-to-assemble and time-saving advantages.

Figure 6:
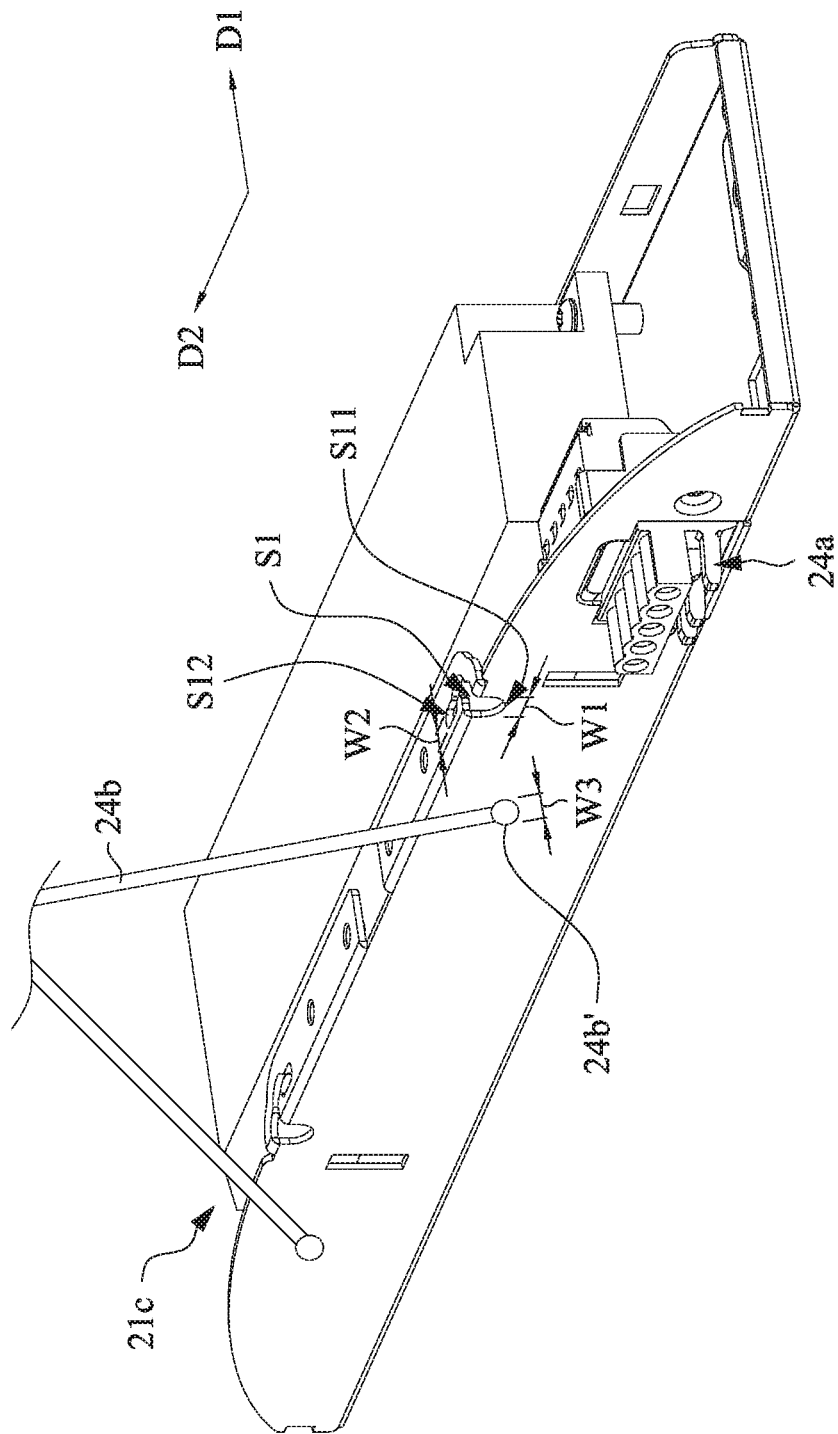
FIG. 6 is a schematic structural diagram showing a first end cap and a suspension member in accordance with an embodiment of the present disclosure.

Referring to FIG. 5 and FIG. 6, FIG. 6 is a schematic structural diagram showing the first end cap 21c and the suspension member 24b in accordance with an embodiment of the present disclosure. In the present embodiment, the first end cap 21c has a groove S1 extending from a side surface of the first end cap 21c to a top surface of the first end cap 21c, and the groove S1 is passed through the top surface and the side surface of the first end cap 21c. The groove S1 is L-shaped and has a first end S11 and a second end S12, in which the first end S11 is located on the side surface of the first end cap 21c, and the second end S12 is located on the top surface of the first end cap 21c. In addition, a limiting block 24b' is disposed on one end of the suspension member 24b, in which a width W1 of the first end S11 of the groove S1 is greater than a width W3 of the limiting block 24b', and a width W2 of the second end S12 of the groove S1 is smaller than the width W3 of the limiting block 24b'. Therefore, the at least one end of the suspension member 24b can be inserted into the groove S1 from the side surface of the first end cap 21c and further be moved along the groove S1. Meanwhile, the suspension member 24b can be pulled down by the lamp due to the gravity of the lamp, and further, because the width W3 of the limiting block 24b' of the suspension member 24b is greater than the width W2 of the second end S12 of the groove S1, the limiting block 24b' of the suspension member 24b cannot escape upward and thus is limited on the top surface of the first end cap 21c. In the embodiment of FIG. 6, after one end of the suspension member 24b is passed through the first end S11 of the groove S1 and moved along the first direction D1, the end of the suspension member 24b is moved along the second direction D2 to the second end S12 of the groove S1. It is noted that, as shown in FIG. 5, the second end cap 21d and the first end cap 21c have substantially same structure, and the second end cap 21d has a groove S2 which will not be described herein.

Referring to FIG. 5 and FIG. 6 again, when the lamp 20 and the lamp 30 are connected in series, the second end cap 21d of the lamp 30 is coupled to the first end cap 21c of the lamp 20, and the groove S2 on the second end cap 21d of the lamp 20 communicates with the groove S1 on the first end cap 21c of the lamp 30. Therefore, the suspension member 24b can be slid from the groove S2 of the lamp 20 to the groove S1 of the lamp 30. More specifically, the suspension member 24b can be slid from the top surface of the second end cap 21d of the lamp 20 to the side surface of the second end cap 21d so as to be departed from the second end cap 21d, and then be slid to the groove S1 on the side surface of the first end cap 21c of the lamp 30 and be further moved to and limited on the top surface of the first end cap 21c of the lamp 30. Therefore, by the design of the suspension member 24b which can be moved between two adjacent lamps, the assembling process between the suspension member and the lamp can be simplified while the lamps are connected in series or disassembled from each other.

Figure 7:
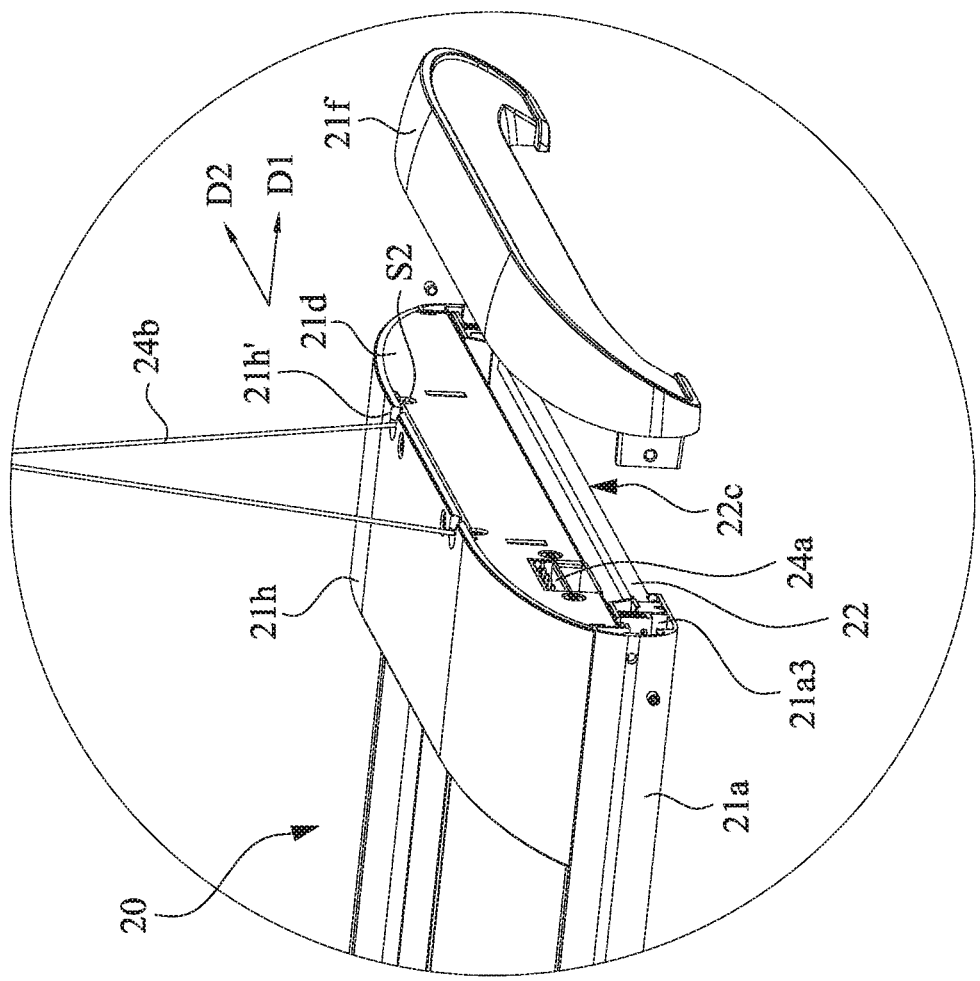
FIG. 7 is a partial enlarged view showing a lamp in accordance with an embodiment of the present disclosure.

Referring to FIG. 2, FIG. 5, FIG. 7, and FIG. 8, FIG. 7, and FIG. 8 are partial enlarged views respectively showing the lamps 20 and 30 in accordance with an embodiment of the present disclosure. In the present embodiment, the first upper cover 21g is used to cover the first end cap 21c, and the second upper cover 21h is used to cover the second end cap 21d. The first upper cover 21g has a notch 21g', and the second upper cover 21h has a notch 21h'. As shown in FIG. 7, when the second upper cover 21h is disposed on the second end cap 21d, the second upper cover 21h covers a portion of the groove S2 of the second end cap 21d, so as to limit the suspension member 24b in the notch 21h'. Similarly, when the first upper cover 21g is disposed on the first end cap 21c, the first upper cover 21g covers a portion of the groove S1 of the first end cap 21c, so as to limit the suspension member 24b in the notch 21g'. Therefore, the first upper cover 21g and the second upper cover 21h can prevent the electrical connecting assembly 24a from the dust accumulated thereon which results in poor heat dissipation. At the same time, the first upper cover 21g and the second upper cover 21h can make the overall appearance of the lamp more streamlined and concise.

Figure 8:
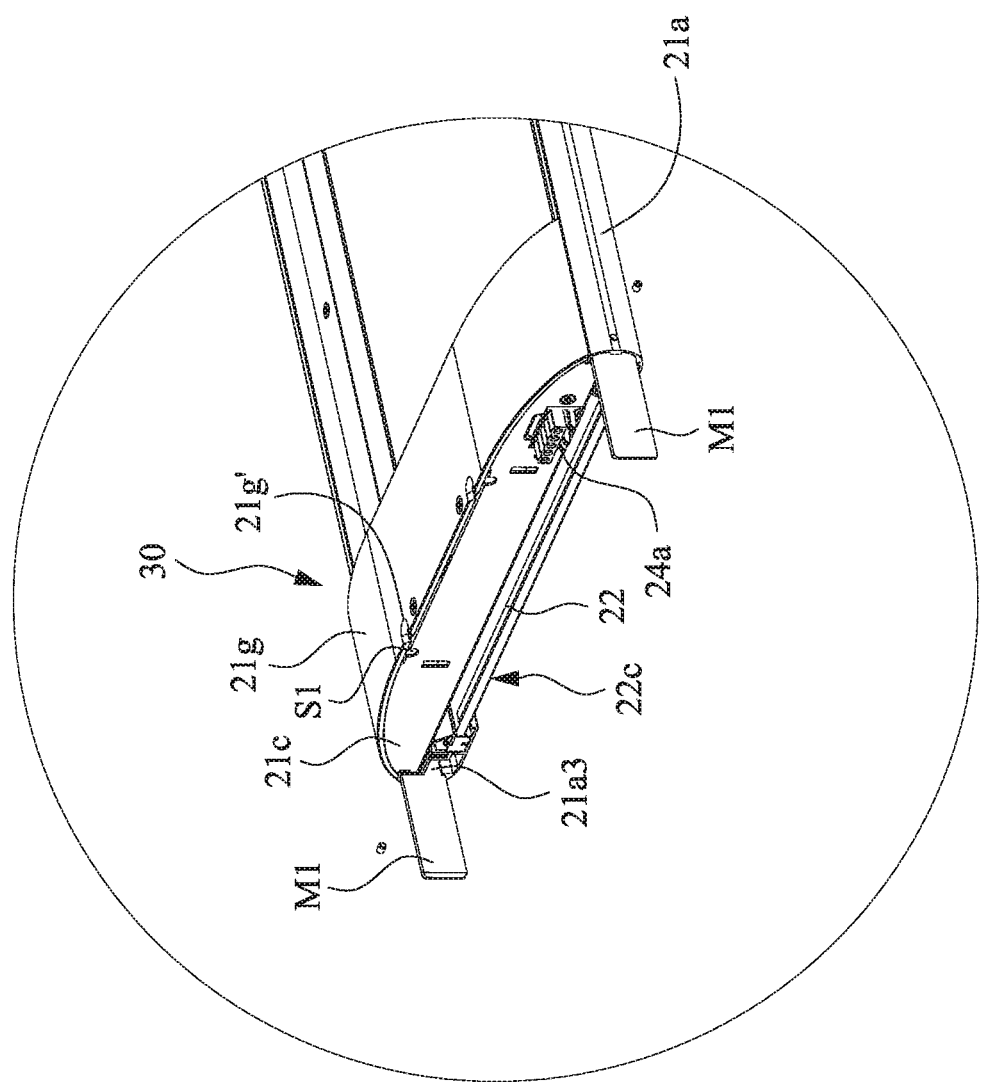
FIG. 8 is another partial enlarged view showing a lamp in accordance with an embodiment of the present disclosure.

Referring to FIG. 2, FIG. 5, FIG. 7 and FIG. 8 again, the present disclosure further provides a method for assembling a lamp system. The method mainly includes the following steps. At first, at least two aforementioned lamps, such as the lamp 20 and the lamp 30, are provided. Thereafter, the second decorative cover 21f and the second upper cover 21h of the lamp 20 are removed, and the first decorative cover 21e and the first upper cover 21g of the lamp 30 are removed. Then, as shown in FIG. 5, the electrical connecting assembly 24a of the lamp 30 is coupled to the electrical connecting assembly 24a of the lamp 20 which is adjacent to the lamp 30, so that the second end cap 21d of the lamp 20 is connected to the first end cap 21c of the lamp 30, and the groove S2 on the second end cap 21d of the lamp 20 communicates with the groove S1 on the first end cap 21c of the lamp 30. Thereafter, the suspension member 24b is slid from the groove S2 of the lamp 20 to the groove S1 of the lamp 30. Then, the second upper cover 21h of the lamp 20 is covered on the second end cap 21d, and the first upper cover 21g of the lamp 30 is covered on the first end cap 21c, so that the suspension member 24b is limited in the notch 21g' of the first upper cover 21g of the lamp 30, thereby forming the lamp system 10 as shown in FIG. 1. In addition, before coupling the lamp 30 to the lamp 20, as shown in FIG. 8, at least at least two supporting bars M1 are correspondingly inserted into the inner spaces 21a3 which are respectively formed between the carrying portion 21a1 and the sidewall 21a2. Therefore, when the second end cap 21d of the lamp 20 is coupled to the first end cap 21c of the lamp 30, one portion of each of the supporting bars M1 is inserted in the inner space 21a3 of the side cover 21a of the lamp 30, and the other portion of each of the supporting bars M1 is inserted in the inner space 21a3 of the side cover 21a of the lamp 20, thereby increasing an engagement stability between the lamp 20 and the lamp 30.

Simultaneously referring to FIG. 4 and FIG. 7, the first end cap 21c and the second end cap 21d are disposed on an upper portion of the side cover 21a, and the light guide plate 22 is disposed on a lower portion of the side cover 21a. When the first decorative cover 21e and the second decorative cover 21f are removed, two opposing side surfaces of the light guide plate 22 which extend along the second direction D2 are respectively aligned with a side surface of the first end cap 21c and a side surface of the second end cap 21d. Therefore, when the lamp 20 and the lamp 30 are connected together, the light guide plate 22 of the lamp 20 and the light guide plate 22 of the lamp 30 are continuously connected to each other. In other words, the second light-emitting surface 22c of the light guide plate 22 of the lamp 20 and the second light-emitting surface 22c of the light guide plate 22 of the lamp 30 are connected to form a continuous light-emitting surface, thereby improving the appearance of the lamp system and reducing dark areas.

Figure 9A:
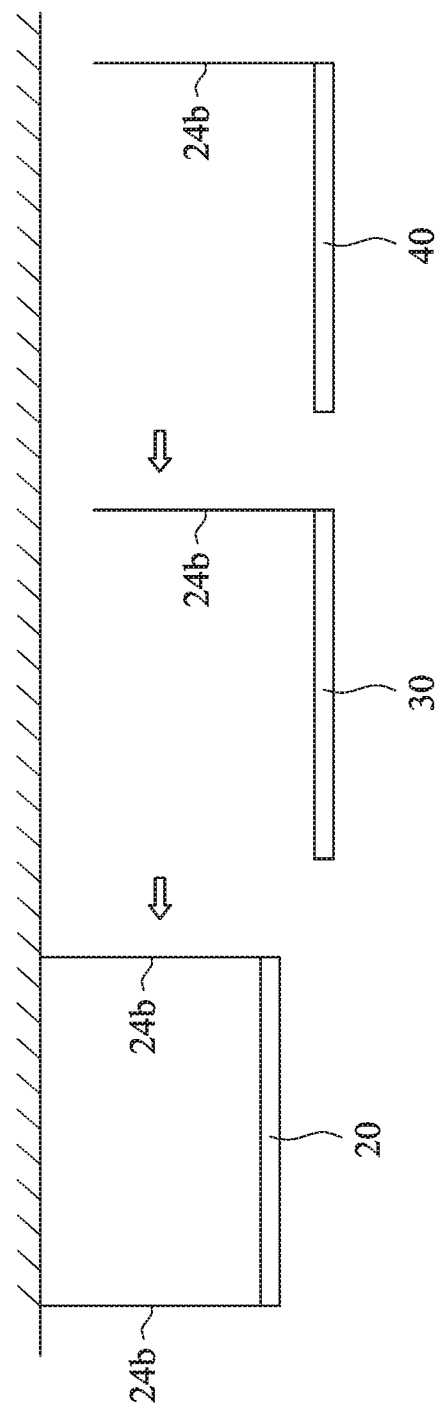
FIG. 9A is a schematic diagram showing an assembling process of a lamp system in accordance with an embodiment of the present disclosure.

Referring to FIG. 9A, FIG. 9A is a schematic diagram showing an assembling process of a lamp system in accordance with an embodiment of the present disclosure. When there is only one lamp 20 (i.e. the first lamp), two suspension members 24b are respectively disposed on two opposing sides of the lamp 20 so as to be fixed on the ceiling. When a second lamp (such as the lamp 30) needs to be additionally mounted, the aforementioned method for assembling the lamp system can be used to connect the lamp 30 to the lamp 20, and only one suspension member 24b is needed to be disposed on one side of the lamp 30 away from the lamp 20, in which the other side of the lamp 30 adjacent to the lamp 20 is connected to the lamp 20 by using the supporting bars M1 as shown in FIG. 8. More specifically, one portion of each of the supporting bars M1 is inserted in the inner space 21a3 of the side cover 21a of the lamp 20, and the other portion of each of the supporting bars M1 is inserted in the inner space 21a3 of the side cover 21a of the lamp 30, thereby increasing an engagement stability between the lamp 20 and the lamp 30. Similarly, when a third lamp (such as the lamp 40) needs to be additionally disposed, the aforementioned method for assembling the lamp system also can be used to connect the lamp 40 to the lamp 30, and only one the suspension member 24b is need to be disposed on one side of the lamp 40 away from the lamp 30, in which the other side of the lamp 40 adjacent to the lamp 30 is connected to the lamp 30 by the supporting bars M1 which protrudes from the side cover of the lamp 40 and is inserted into the side cover of the lamp 30, thereby increasing an engagement stability between the lamp 30 and the lamp 40.

Figure 9B:
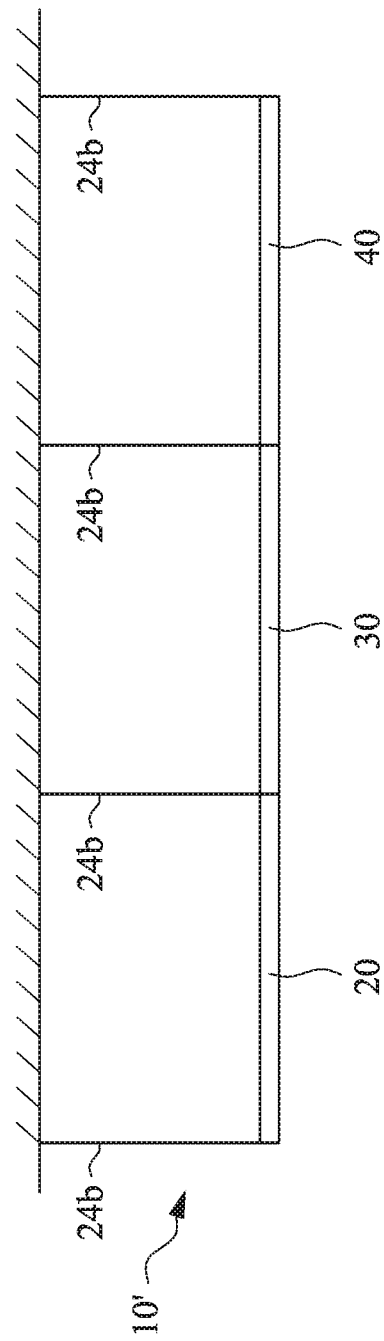
FIG. 9B is a schematic diagram showing a lamp system in an assembled state in accordance with an embodiment of the present disclosure.
Figure 9C:
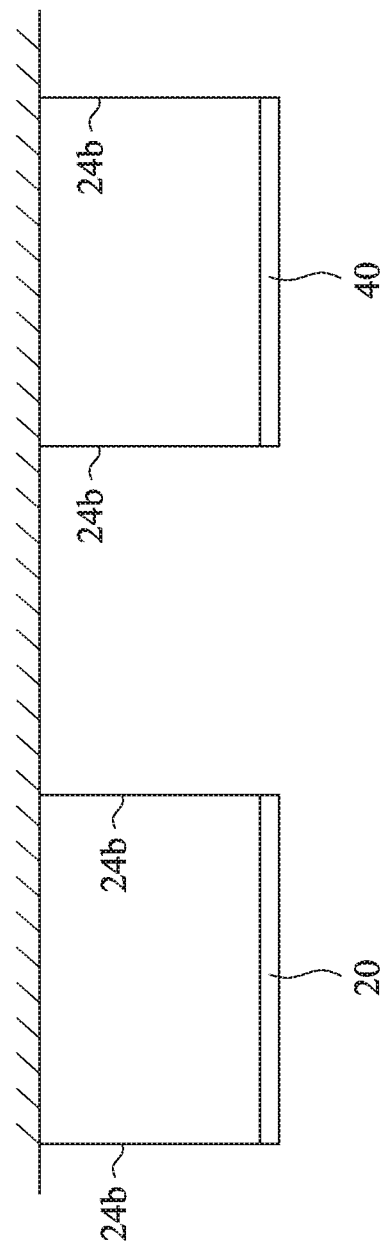
FIG. 9C is a schematic diagram showing a lamp in a disassembled state in accordance with an embodiment of the present disclosure.

Referring to FIG. 9B and FIG. 9C, FIG. 9B is a schematic diagram showing a lamp system in an assembled state in accordance with an embodiment of the present disclosure, and FIG. 9C is a schematic diagram showing a lamp in a disassembled state in accordance with an embodiment of the present disclosure. The present disclosure further provides a method for disassembling a lamp system. The method mainly includes the following steps. At first, a lamp system 10' shown in FIG. 9B is provided. Then, before the lamp 30 is disassembled, the suspension member 24b of the lamp 30 is slid from the groove of the lamp 30 to the groove of the lamp 40. Thereafter, the electrical connecting assemblies which located on two opposite sides of the lamp 30 are respectively separated from the electrical connecting assembly of the lamp 30 and the electrical connecting assembly of the lamp 34, thereby separating two opposing end caps of the lamp 30 from the lamp 20 and the lamp 40 respectively. Then, the lamp 30 is removed so as to form two separated lamps (i.e. the lamp 20 and the lamp 40) as shown in FIG. 9C. By the lamp design of the present disclosure, the user can remove one of the lamps from the lamp system without additionally setting or removing another suspension member, thereby simplifying the overall lamp structure as well as simplifying the assembling and disassembling method.

According to the aforementioned embodiments of the present disclosure, the present disclosure uses the frame body to integrate the electrical connecting assembly and the suspension member, thereby simplifying the structure of the lamp as well as providing an easy-to-assemble (or easy-to-disassemble) way for users when multiple lamps need to be connected together or disassembled from each other.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A lamp, comprising:
a frame body comprising two side covers and two end caps, wherein an accommodating space is formed among the side covers and the end caps;
a light guide plate disposed in the accommodating space;
at least one light source disposed in the at least one of the side covers, wherein the light source is disposed adjacent to a light-incident surface of the light guide plate; and
a connecting mechanism disposed in the frame body, wherein the connecting mechanism comprises:
an electrical connecting assembly which is connected to the light source to form an electrical loop; and
a suspension member, wherein each of the end caps has a groove, a side surface and a top surface, wherein the groove comprises a first sub groove and a second sub groove, and wherein at least one end of the suspension member is passed through the first sub grooves located on the side surface and is positioned in the second sub groove located on the top surface;
wherein the second sub groove comprises a first channel and a second channel, and the first channel extends along a direction, and the second channel extends along a second direction; and
wherein the first direction is different from the second direction.

2. The lamp of claim 1, further comprising a plurality of side bars respectively and correspondingly fixed on the side covers, wherein
each of the side covers comprises a carrying portion, a first end and a second end opposite to the first end;
each of the side bars separates its corresponding side cover into an upper channel and a lower channel;
the two end caps are disposed in the upper channels, and one of the two end caps is located at the first ends of the side covers, and the other one of the two end caps is located at the second ends of the side covers; and
the light guide plate is carried on the carrying portions of the side covers and is located in the lower channels of the side covers.

3. The lamp of claim 1, wherein the light guide plate has a first light-emitting surface and a second light-emitting surface, wherein the first light-emitting surface and the second light-emitting surface are respectively connected to two opposite edges of the light-incident surface, and only side edge portions of the first light-emitting surface and the second light-emitting surface are covered by the frame body.

4. The lamp of claim 1, wherein
a limiting block is disposed on the at least one end of the suspension member; and
a width of the first sub groove is greater than a width of the limiting block, and a width of the second sub groove is smaller than the width of the limiting block.

5. The lamp of claim 1, wherein
the frame body further comprises two upper covers respectively covering the end caps; and
each of the upper covers has a notch, wherein the notches are respectively corresponding to the grooves of the end caps, and the suspension member is located in the at least one of the notches.

6. A lamp system, comprising:
at least two lamps of claim 1;
wherein the end cap of one of the lamps is coupled to the end cap of another one of the lamps adjacent to the one of the lamps, and the groove of the end cap of the one of the lamps communicates with the groove of the end cap of the another one of the lamps;
wherein the electrical connecting assembly of the one of the lamps is connected to the electrical connecting assembly of the another one of the lamps; and
the at least one end of the suspension member is slidable between the grooves of the adjacent end caps.

7. The lamp system of claim 6, wherein the light guide plates of the lamps are continuously connected to each other.

8. The lamp system of claim 6, wherein
the electrical connecting assembly of an endmost one of the lamps is connected to an external power source; and
the electrical connecting assembly of each of the rest of the lamps is connected to the electrical connecting assembly of its adjacent lamp so as to form a connection with the endmost one of the lamps.

9. A method for disassembling a lamp system, comprising:
providing a lamp system, wherein the lamp system comprises at least two lamps of claim 1;
sliding the suspension member out of the groove of one of the lamps desired to be disassembled into the groove of another one of the lamps adjacent to the one of the lamps;
separating the one of the lamps from the another one of the lamps so as to separate the end cap of the one of the lamps from the end cap of the another one of the lamps; and
removing the one of the lamps.

10. The method for disassembling a lamp system of claim 9, wherein
the groove of each of the lamps extends from a side surface of the end cap to a top surface of the end cap; and
the suspension member is first slid from the top surface to the side surface of the end cap of the one of the lamps desired to be disassembled and is further slid to the side surface of the end cap of the another one of the lamps adjacent to the one of the lamps and is then positioned on the top surface of the end cap of the another one of the lamps.

11. A method for assembling a lamp system, comprising:
providing at least two lamps of claim 1;
connecting the electrical connecting assembly of one of the lamps to the electrical connecting assembly of another one of the lamps adjacent to the one of the lamps, so that the end cap of the one of the lamps is connected to the end cap of the another one of the lamps, and the groove of the end cap of the one of the lamps communicates with the groove of the end cap of another one of the lamps; and
sliding the suspension member from the groove of the one of the lamps to the groove of the another one of the lamps.

12. The method for assembling a lamp system of claim 11, wherein
- the groove of each of the lamps extends from a side surface of the end cap to a top surface of the end cap; and
- the suspension member is first slid from the top surface to the side surface of the end cap of the one of the lamps and is further slid to the side surface of the end cap of the another one of the lamps and is then positioned on the top surface of the end cap of the another one of the lamps.

13. The method for assembling a lamp system of claim 11, wherein
- the frame body of each of the lamps further comprises two upper covers respectively corresponding to the end caps, and each of the upper covers has a notch corresponding to each groove;
- after sliding the suspension member from the groove of the one of the lamps to the groove of the another one of the lamps, the method further comprises respectively covering the upper covers on the end caps so as to limit the suspension member in the notch of the upper cover.

14. The method for assembling a lamp system of claim 11, before connecting the end cap of the one of the lamps to the end cap of the another one of the lamps adjacent to the one of the lamps, the method for assembling a lamp system further comprises a step for disposing at least two supporting bars between the inner spaces of the side covers of adjacent two lamps.

* * * * *